United States Patent
Markham et al.

(10) Patent No.: US 7,308,706 B2
(45) Date of Patent: Dec. 11, 2007

(54) ASSOCIATIVE POLICY MODEL

(75) Inventors: Thomas R. Markham, Anoka, MN (US); Jessica J. Bogle, White Bear Lake, MN (US); Charles N. Payne, Jr., Oakdale, MN (US)

(73) Assignee: Secure Computing Corporation, St. Paul, MN (US)

( * ) Notice: Subject to any disclaimer, the term of this patent is extended or adjusted under 35 U.S.C. 154(b) by 897 days.

(21) Appl. No.: 10/281,843

(22) Filed: Oct. 28, 2002

(65) Prior Publication Data

US 2004/0083382 A1    Apr. 29, 2004

(51) Int. Cl.
H04L 29/00 (2006.01)
G06F 15/16 (2006.01)

(52) U.S. Cl. .............................. 726/4; 726/15; 709/227

(58) Field of Classification Search ...................... 726/4
See application file for complete search history.

(56) References Cited

U.S. PATENT DOCUMENTS

| | | |
|---|---|---|
| 5,557,742 A | 9/1996 | Smaha et al. |
| 5,748,736 A | 5/1998 | Mittra |
| 5,758,069 A | 5/1998 | Olsen |
| 5,889,958 A | 3/1999 | Willens |
| 5,896,499 A | 4/1999 | McKelvey |
| 5,898,784 A | 4/1999 | Kirby et al. |
| 5,915,008 A | 6/1999 | Dulman |
| 5,953,335 A | 9/1999 | Erimli et al. |
| 5,968,176 A | 10/1999 | Nessett et al. |
| 6,049,789 A | 4/2000 | Frison et al. |
| 6,055,429 A | 4/2000 | Lynch |
| 6,079,020 A | 6/2000 | Liu |
| 6,134,327 A | 10/2000 | Van Oorschot |
| 6,167,445 A * | 12/2000 | Gai et al. ................... 709/223 |
| 6,173,399 B1 | 1/2001 | Gilbrech et al. |

(Continued)

FOREIGN PATENT DOCUMENTS

EP        1024627        8/2000

(Continued)

OTHER PUBLICATIONS

"European Search Report for Application No. EP 03 25 6821, date mailed Dec. 12, 2004", 4 pages.

(Continued)

Primary Examiner—Gilberto Barron, Jr.
Assistant Examiner—Kristin D. Sandoval
(74) Attorney, Agent, or Firm—Schwegman, Lundberg & Woessner, P.A.

(57) ABSTRACT

Systems and methods for an associative policy model are provided. One embodiment of the present invention provides a method for implementing an associative policy. In this embodiment, the method includes providing a policy on a policy server, the policy having a service definition that contains first and second relational components, providing first and second network entities, operatively coupling the first and second network entities to the policy server, dynamically associating the first network entity with the second network entity (wherein such associating includes binding the first relational component of the service definition in the policy to the first network entity, and binding the second relational component of the service definition in the policy to the second network entity), and enforcing the policy on the first and second network entities.

47 Claims, 8 Drawing Sheets

U.S. PATENT DOCUMENTS

| | | | |
|---|---|---|---|
| 6,182,226 B1* | 1/2001 | Reid et al. | 726/15 |
| 6,195,751 B1 | 2/2001 | Caronni et al. | |
| 6,215,872 B1 | 4/2001 | Van Oorschot | |
| 6,223,286 B1 | 4/2001 | Hashimoto | |
| 6,226,748 B1 | 5/2001 | Bots et al. | |
| 6,226,751 B1 | 5/2001 | Arrow et al. | |
| 6,272,538 B1 | 8/2001 | Holden et al. | |
| 6,298,378 B1 | 10/2001 | Angal et al. | |
| 6,298,445 B1 | 10/2001 | Shostack et al. | |
| 6,363,154 B1 | 3/2002 | Peyravian et al. | |
| 6,463,474 B1 | 10/2002 | Fuh et al. | |
| 6,546,546 B1 | 4/2003 | Van Doorn | |
| 6,611,863 B1 | 8/2003 | Banginwar | |
| 6,718,379 B1 | 4/2004 | Krishna et al. | |
| 6,823,462 B1 | 11/2004 | Cheng et al. | |
| 6,859,827 B2 | 2/2005 | Banginwar | |
| 6,944,183 B1 | 9/2005 | Iyer et al. | |
| 6,959,078 B1 | 10/2005 | Eilbacher et al. | |
| 7,039,708 B1 | 5/2006 | Knobl et al. | |
| 7,231,664 B2 | 6/2007 | Markham, et al. | |
| 7,234,063 B1 | 6/2007 | Baugher et al. | |
| 2002/0037736 A1 | 3/2002 | Kawaguchi et al. | |
| 2002/0055989 A1 | 5/2002 | Stringer-Calvert, et al. | |
| 2002/0062333 A1 | 5/2002 | Anand, et al. | |
| 2002/0157024 A1* | 10/2002 | Yokote | 713/201 |
| 2002/0164025 A1 | 11/2002 | Raiz et al. | |
| 2003/0055989 A1 | 3/2003 | Zamanzadeh et al. | |
| 2003/0126464 A1 | 7/2003 | McDaniel et al. | |
| 2003/0204722 A1 | 10/2003 | Scheon et al. | |
| 2003/0226013 A1 | 12/2003 | Dutertre | |
| 2005/0086300 A1 | 4/2005 | Yeager, et al. | |

FOREIGN PATENT DOCUMENTS

| | | |
|---|---|---|
| GB | 2356763 | 5/2001 |
| WO | WO-99/67931 | 12/1999 |
| WO | WO-0069145 A1 | 11/2000 |
| WO | WO-0078004 A3 | 12/2000 |

OTHER PUBLICATIONS

Harney, H., et al., "Group Secure Association Key Management Protocol", http://www.watersprings.org/pub/id/draft-harney-sparta-gsakmp-sec-02.txt, Internet Engineering Task Force,(Jun. 30, 2000),1-41.

McDaniel, P., et al., "Antigone: A Flexible Framework for Secure Group Communication", http://antigone.eecs.umich.edu/publications/usec99.pdf, (May 23, 1999),1-15.

McDaniel, P., et al., "Flexibly Constructing Secure Groups in Antigen 2.0", *DARPA Information Survivability Conference & Exposition II, 2001, DISCEX '01, Proceedings*, vol. 2, (Jun. 12, 2001),55-67.

Zao, J., et al., "Domain Based Internet Security Policy Management", http://www.ir.bbn.com/ {krash/pub/zao_discex00.pdf, BBN Technologies Inc., (Dec. 31, 1999),41-53.

Eli, H., "Secure Virtual Private networks: The Future of Data Communications", *International Journal of Network Management*, 9. (1999),213-220.

Amendment and Response mailed May 21, 2007 in U.S. Appl. No. 10/304,469, 18 pgs.

Amendment and Response mailed Aug. 22, 2006 in U.S. Appl. No. 10/304,469, 15 pgs.

Amendment and Response to Final Office Action mailed Apr. 30, 2007 in U.S. Appl. No. 10/234,223, 12 pgs.

Final Office Action mailed Oct. 30, 2006 in U.S. Appl. No. 10/234,233, 25 pgs.

International Search Report mailed Jun. 10, 2002 in PCT Application No. PCT/US01/17153, 3 pgs.

Non-Final Office Action mailed Nov. 21, 2006 in U.S. Appl. No. 10/304,469, 10 pgs.

Non-Final Office Action mailed Sep. 29, 2006 in U.S. Appl. NO 10,234,224, 10 pgs.

Notice of Allowance mailed Jan. 31, 2007 in U.S. Appl. No. 10/234,224, 9 pgs.

Office Action mailed Mar. 7, 2006 in U.S. Appl. No. 10/234,223, 13 pgs.

Office Action mailed Jun. 13, 2006 in U.S. Appl. No. 10/304,469, 12 pgs.

Request for Continued Examination mailed Apr. 30, 2007 in U.S. Appl. No. 10/234,223, 18 pgs.

Response mailed Dec. 29, 2006 in U.S. Appl. No. 10-234,224, 15 pgs.

Response to Non-Final Office Action mailed Aug. 7, 2006 in U.S. Appl. No. 10/234,223, 19 pgs.

Supplemental Notice of Allowability mailed Apr. 3, 2007 in U.S. Appl. No. 10/234,224, 3 pgs.

Brenne, A., "Interface Cards, The Network Interface Card Provides the Physical Connection to the network", [online]. *IT Architect*, Jan. 1, 1999. [retrieved Nov. 4, 2006]. retrieved from the Internet: <URL: http://www.itarchitect.com/article NMG20000727S0005>, 4 pgs.

Elson, D., "Intrusion Detection, Theory and Practice", [online]. © 2005 Security Focus. [retrieved Nov. 4, 2006]. Retrieved from the Internet: <URL: http://www.securityFocus.com/infocus/1203>, 9 pgs.

"Application U.S. No. 10/234,223 Non-Final Office Action mailed Mar. 7, 2006", (Mar. 7, 2006), 13.

"Non-Final Office Action Mailed Jul. 24, 2007 in U.S. Appl. No. 10/234,223, 26 pgs.".

* cited by examiner

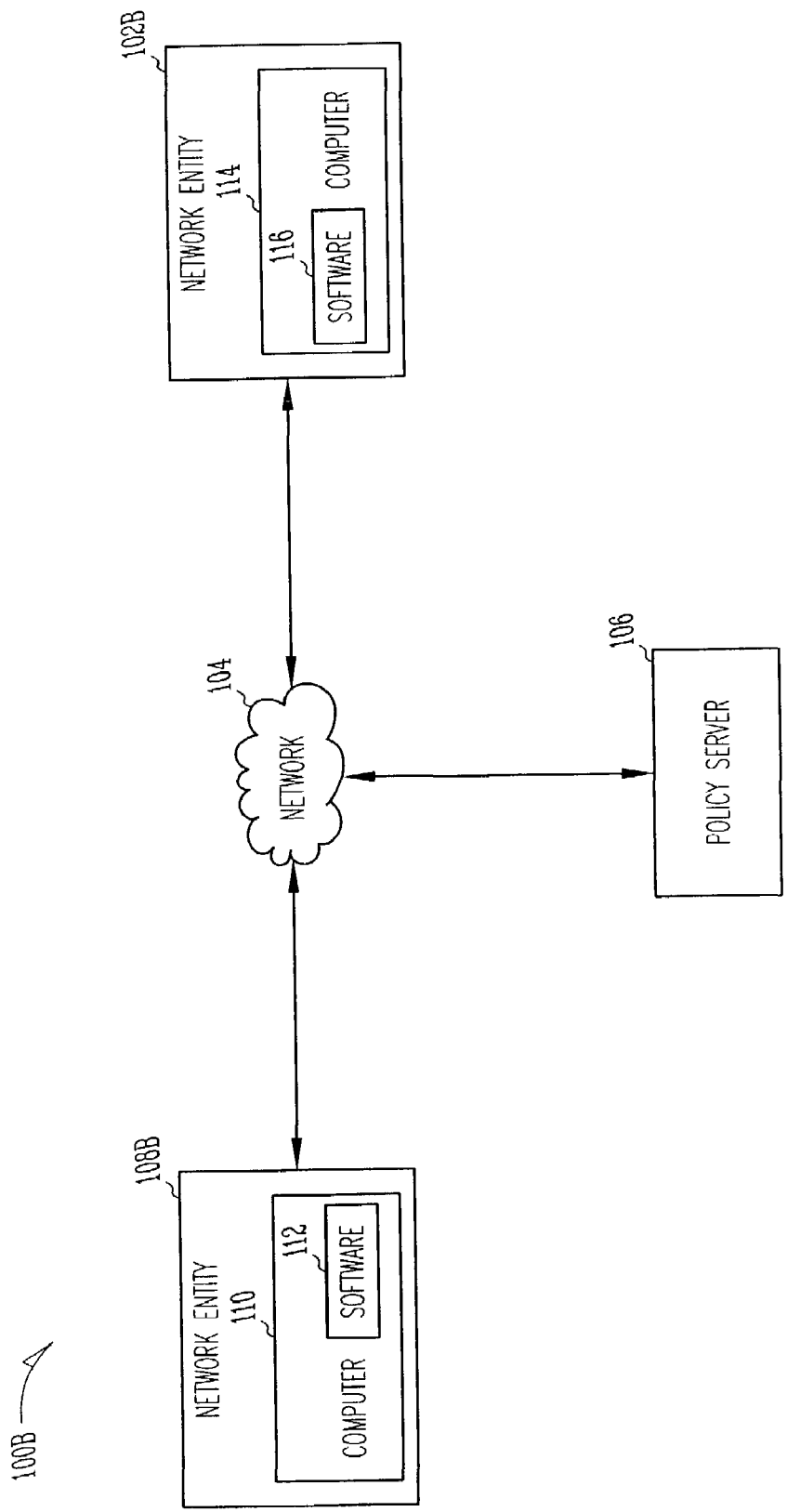

NID=NETWORK INTERFACE DEVICE

US 7,308,706 B2

ASSOCIATIVE POLICY MODEL

RELATED CO-PENDING APPLICATION

This application is related to co-pending patent application Ser. No. 10/234,223, filed Sep. 4, 2002.

FIELD OF THE INVENTION

The present invention relates to computing systems, and more particularly to methods and systems for implementing an associative policy model.

BACKGROUND OF THE INVENTION

There are a growing number of networked users (clients). In addition, there are a growing number of network applications (servers) that provide an array of services for these users. In such an environment, data security is often a concern. Users continually access servers, and servers respond to requests arriving via the network.

To help manage security concerns, many Internet or other network systems implement security policies, wherein a policy server, for example, controls security for a domain according to the rules in its policy. In this fashion, the policy server is able to address the security needs for the nodes in the domain by enforcing the rules in the policy.

Typical policy specification models require explicit specification of the network elements in a given security domain. The explicit specification may include the host names or Internet Protocol (IP) addresses of the network elements, and such information often needs to be built into the policy model up front. If the name or IP address of a given network element changes over time (such as when the Dynamic Host Configuration Protocol (DHCP) is used), or if network elements are added or deleted from a domain, the policy model may need to be manually updated, and the information pointed to by each of the network elements may also need to change. This requires additional effort, and introduces more potential for error and inconsistency. In addition, the policy model in such implementations is often dependent on the network topology. For example, if the policy uses hard-coded IP addresses, the policy must frequently change to remain consistent with the IP address changes.

For the reasons stated above, and for other reasons stated below which will become apparent to those skilled in the art upon reading and understanding the present specification, there is a need for the present invention.

SUMMARY OF THE INVENTION

Various embodiments of the present invention are provided herein. One embodiment provides a method for implementing an associative policy. In this embodiment, the method includes providing a policy on a policy server, the policy having a service definition that contains first and second relational components, providing first and second network entities, operatively coupling the first and second network entities to the policy server, dynamically associating the first network entity with the second network entity (wherein such associating includes binding the first relational component of the service definition in the policy to the first network entity, and binding the second relational component of the service definition in the policy to the second network entity), and enforcing the policy on the first and second network entities.

This embodiment, as well as other embodiments, will be described in the detailed description below.

BRIEF DESCRIPTION OF THE DRAWINGS

FIG. 1B illustrates a block diagram for one embodiment of the system shown in FIG. 1A, wherein the network entities each include a computer having a software component.

DETAILED DESCRIPTION

Figure 1A:
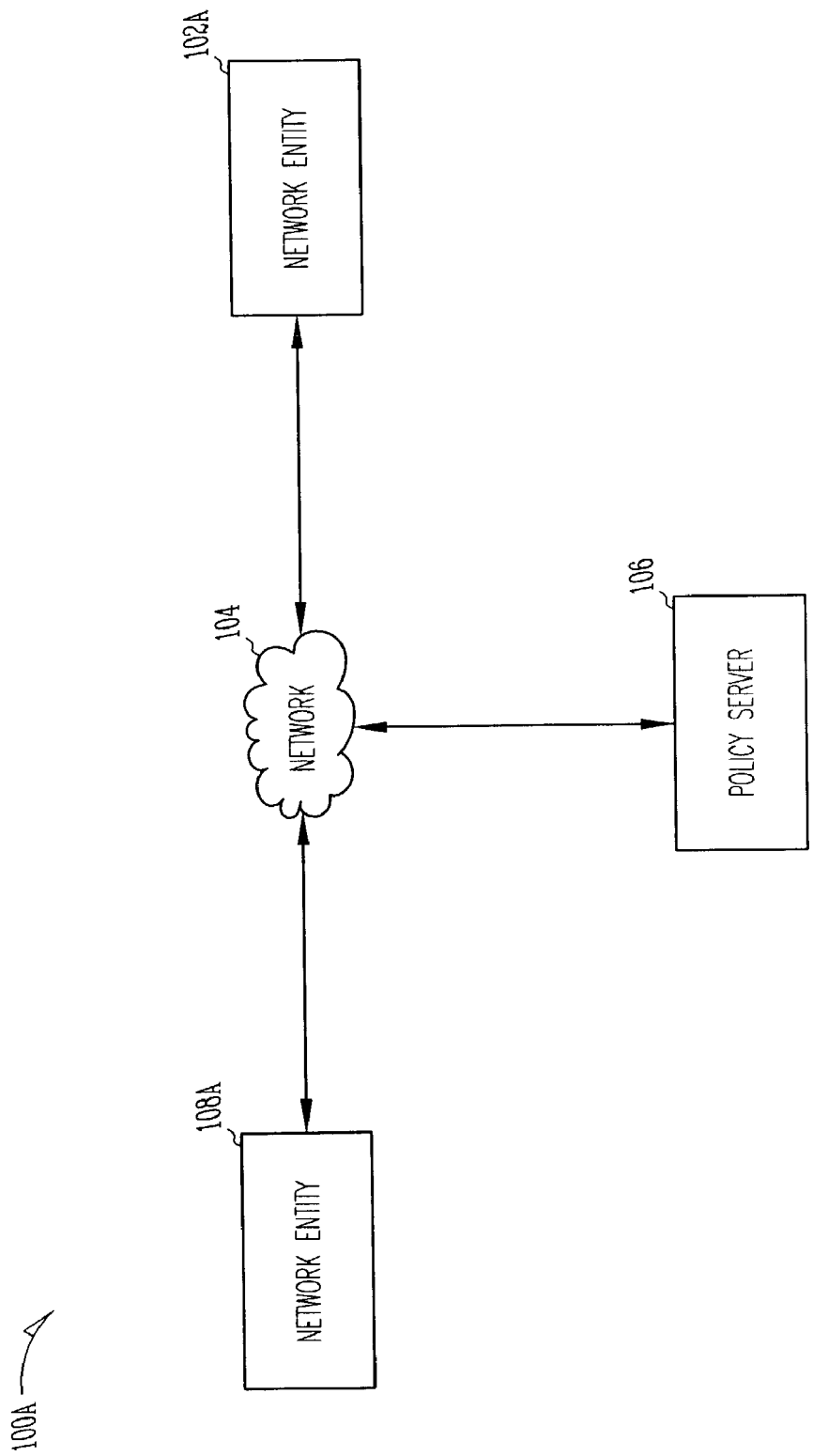
FIG. 1A illustrates a block diagram of a system having multiple network entities and a policy server for implementing various embodiments of the present invention.

In the following detailed description of the embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. It is also to be understood that the various embodiments of the invention, although different, are not necessarily mutually exclusive. For example, a particular feature, structure or characteristic described in one embodiment may be included within other embodiments. The following description is, therefore, not to be taken in a limiting sense.

One embodiment of the invention provides an associative policy model. An associative policy is a policy that is based upon a high level association between a pair of entities. For example, entity associations could include: (1) email client and email server; (2) sales person and sales database; (3) Network Basic Input/Output System (NetBIOS) client and NetBIOS server; or (4) web client and web proxy. An associative policy model is a model that is used to define and apply a security policy to sets of such entities based upon their association. Such a model is capable of implementing a policy specification that is independent of the network topology or the addresses of the machines involved. The policy specification may be used to specify a service agreement between entities or it can be used to define a security policy for the entities. Associative policies allow easy creation and management of security policy (packet filtering and cryptographic associations). This makes a policy selfmaintaining with respect to Internet Protocol (IP), and provides flexible support for Dynamic Host Configuration Protocol (DHCP) based IP addresses. Support is also provided for users (or entities) in both wired or wireless environments that may include laptops, personal digital assistants (PDA's), and the like.

This embodiment of the invention allows more dynamic assignment of a policy (or policies) to a device. For example, a laptop could be assigned to the engineering group one day, but moved to the management group the next. The associative policy model can automatically (without manual administrator action) resolve the services to be provided to the laptop and load the correct IP address information into the laptop and all associated servers.

In one embodiment, an associative policy model is implemented in a wired network, wherein network entities include Network Interface Cards (NIC's). In one embodiments, the model is implemented in a wireless network. In one embodiment, the model is implemented using software on host machines rather than on the NIC's. Implementing a software solution inside of servers, routers, PDA's, or cell phones allows explicit address specification, and may require less work by the policy administrator.

FIG. 1A illustrates a block diagram of a system having multiple network entities and a policy server for implementing various embodiments of the present invention. In FIG. 1A, system 100A includes network entity 108A, network 104, policy server 106, and network entity 102A. Network entity 108A, policy server 106, and network entity 102A are each coupled to network 104. In one embodiment, network 104 is a wired network. In one embodiment, network 104 is a wireless network. In one embodiment, network 104 is an Internet-based network. In one embodiment, policy server 106 has a security policy that includes a first set of rules and a second set of rules, and each of the set of rules has one or more placeholders. When system 100A is operational, policy 106 acts to convert the security policy into a first entity policy by inserting entity information for network entity 102A into the placeholders of the first set of rules, convert the security policy into a second entity policy by inserting entity information for network entity 108A into the placeholders of the second set of rules, send the first entity policy to network entity 108A, and send the second entity policy to network entity 102A.

FIG. 1B illustrates a block diagram for one embodiment of the system shown in FIG. 1A, wherein the network entities each include a computer having a software component. In FIG. 1B, system 100B includes network entity 108B, network 104, policy server 106, and network entity 102B. Network entity 108B, policy server 106, and network entity 102B are each coupled to network 104. In this embodiment, network entity 108B includes computer 110, and network entity 102B includes computer 114. Computer 110 includes software component 112, and computer 114 includes software component 116. This embodiment provides a software solution for the associative policy implementation.

Figure 1C:
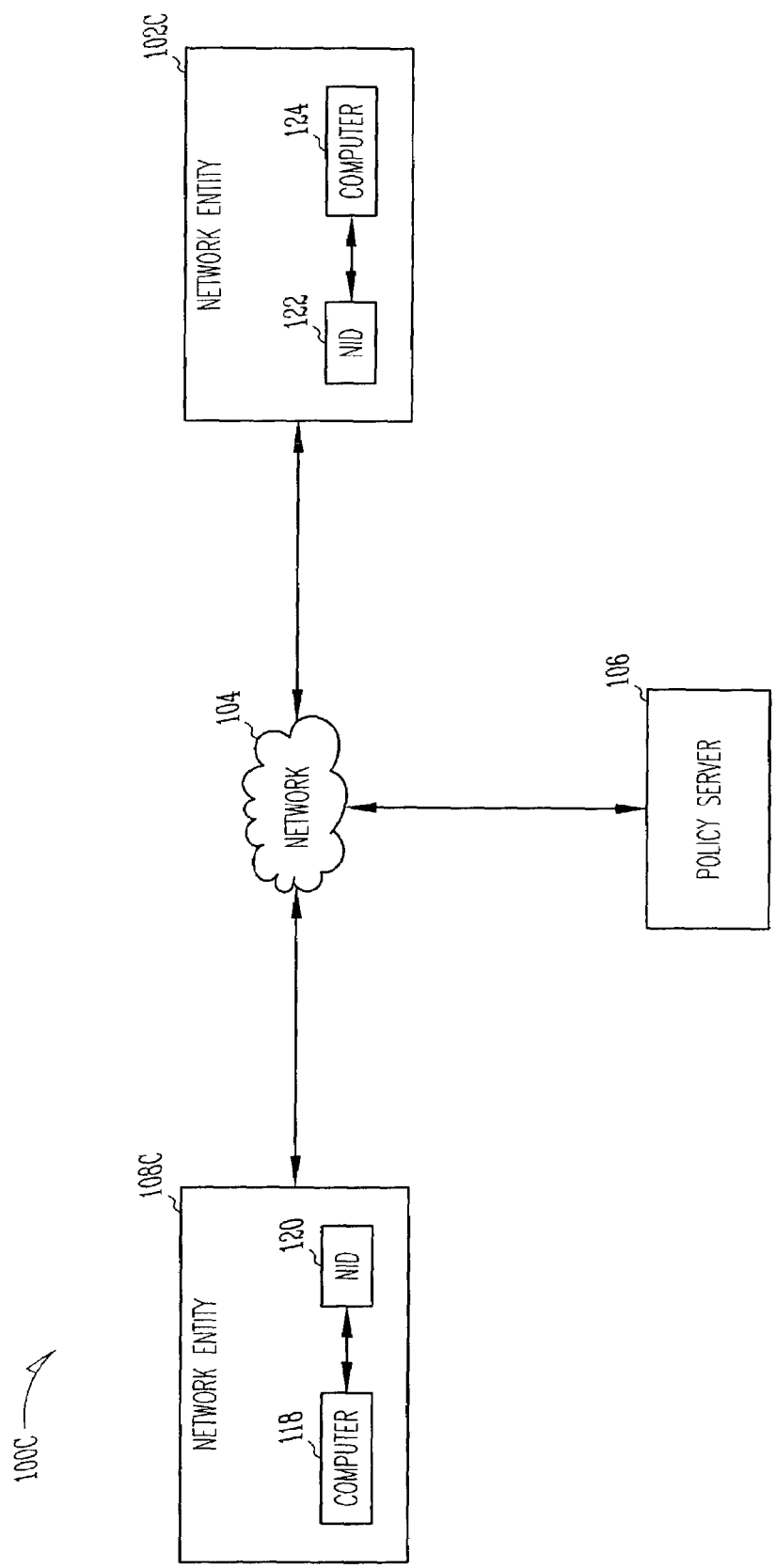
FIG. 1C illustrates a block diagram for one embodiment of the system shown in FIG. 1A, wherein the network entities each include a computer and a network interface device.

FIG. 1C illustrates a block diagram for one embodiment of the system shown in FIG. 1A, wherein the network entities each include a computer and a network interface device. In FIG. 1C, system 100C includes network entity 108C, network 104, policy server 106, and network entity 102C. Network entity 108C, policy server 106, and network entity 102C are each coupled to network 104. Network entity 108C includes computer 118 and network interface device 120. Computer 118 is coupled to network interface device 120. Similarly, network entity 102C includes computer 124 and network interface device 122. Computer 124 is coupled to network interface device 122. In one embodiment, network interface devices 120 and 122 comprise NIC's. In one embodiment, system 100C contains a distributed firewall as described in U.S. patent application Ser. No.: 09/578,314, filed May 25, 2000, entitled: DISTRIBUTED FIREWALL SYSTEM AND METHOD, wherein network interface devices 120 and 122 each include an embedded firewall for authorizing data packets.

In another embodiment of the present invention, a method for implementing an associative policy is provided. In this embodiment, the method includes providing a policy on a policy server (the policy having a service definition that contains first and second relational components), providing first and second network entities, operatively coupling the first and second network entities to the policy server, dynamically associating the first network entity with the second network entity (wherein such associating includes binding the first relational component of the service definition in the policy to the first network entity, and binding the second relational component of the service definition in the policy to the second network entity), and enforcing the policy on the first and second network entities.

In some embodiments, providing a policy on a policy server includes providing a security policy on a policy server. In some embodiments, providing a policy on a policy server includes providing a policy having a service definition that contains first and second relational components, and wherein the service definition corresponds to an email service, a sales database service, a network basic input/output system (NetBIOS) service, or a web service. In some embodiments, providing a policy on a policy server includes providing a policy having a service definition that contains first and second relational components, and wherein each of the first and second relational components includes one or more packet filtering rulesets. In some embodiments, providing a policy having a service definition that contains first and second relational components includes providing a policy having a service definition that includes a client relational component and a server relational component, and wherein providing first and second network entities includes providing a server device and a client device.

In some embodiments, providing first and second network entities includes providing first and second network entities selected from a group consisting of devices, users, and software packages. In some embodiments, providing first and second network entities includes providing first and second members of a virtual private group (VPG) or a virtual private network (VPN). VPG's are described in co-pending patent application Ser. No. 10/234,223.

In some embodiments, providing first and second network entities includes providing a first member of a first VPG and a second member of a second VPG. In some embodiments, providing first and second network entities includes providing first and second network entities that are associated with one or more device sets. In some embodiments, providing first and second network entities includes providing first and second network entities having Internet Protocol (IP) addresses that are assigned according to the Dynamic Host Configuration Protocol (DHCP). In some embodiments, providing first and second network entities includes providing first and second network entities that each include a network interface device for managing an embedded firewall.

In some embodiments, operatively coupling the first and second network entities to the policy server includes sending the Internet Protocol (IP) addresses of the first and second network entities to the policy server. In some embodiments, operatively coupling the first and second network entities to the policy server includes binding a first user to the first network entity, the first user being associated with a first role, binding a second user to the second network entity, the second user being associated with a second role, identifying a first Internet Protocol (IP) address of the first network entity, identifying a second IP address of the second network entity, sending the first role and first IP address information to the policy server, and sending the second role and second IP address information to the policy server.

In some embodiments, binding the first relational component of the service definition in the policy to the first network entity includes sending the first relational component of the service definition in the policy to the first network entity. In some embodiments, binding the second relational component of the service definition in the policy to the second network entity includes sending the second relational component of the service definition in the policy to the second network entity.

Figure 2:
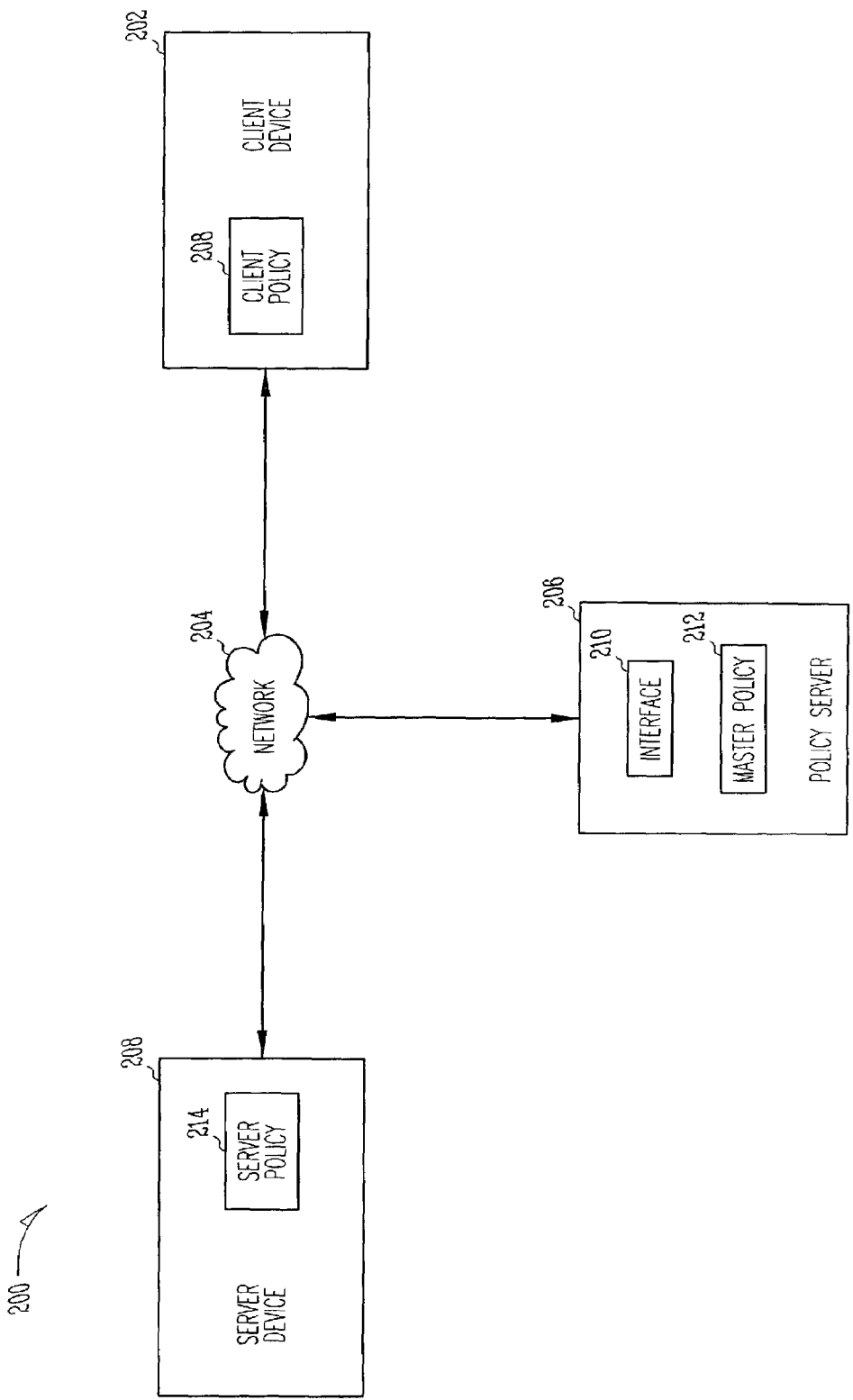
FIG. 2 illustrates a block diagram of a client-server and policy server system for implementing various embodiments of the present invention.

FIG. 2 illustrates a block diagram of a client-server and policy server system for implementing various embodiments of the present invention. (Certain embodiments of the invention, as will be described later, also provide peer to peer (such as client to client, or server to server) support.) In FIG. 2, system 200 includes server device 208, network 204, policy server 206, and client device 202. In one embodiment, network 204 is a wired network. In one embodiment, network 204 is a wireless network. In one embodiment, network 204 is an Internet-based network. In one embodiment, network 204 is an Intranet. In one embodiment, server device 208 and client device 202 each include NIC's. In one embodiment, server device 208 and client device 202 each include software components for implementing an associative policy. Server device 208, policy server 206, and client device 202 are each coupled to network 204. Server device 208 includes server policy 214, and client device 202 includes client policy 208. Policy server 206 includes interface 210 (to couple policy server 206 with server device 208 and client device 202 via network 204), and master policy 212. In one embodiment, master policy 212 includes a client component and a server component.

When system 200 is operational, policy server 206 acts to obtain server information about server device 208, obtain client information about client device 202, create client policy 208 using the client component of master policy 212 and the server information, create server policy 214 using the server component of master policy 212 and the client information, send client policy 208 to client device 202, and send server policy 214 to server device 208.

One embodiment enforces client policy 208 on client device 202, and enforces server policy 214 on server device 208. Another embodiment, enforces only server policy 214 on server device 208.

In another embodiment of the present invention, a computer-implemented method on a policy server is provided. In this embodiment, the method includes providing a master policy on the policy server (the master policy having a first component and a second component), binding the policy server to a first device to obtain information about the first device, binding the policy server to a second device to obtain information about the second device, creating a first policy on the policy server using the first component of the master policy and the information about the second device, creating a second policy on the policy server using the second component of the master policy and the information about the first device, sending the first policy to the first device, and sending the second policy to the second device.

In some embodiments, binding the policy server to a first device to obtain information about the first device includes binding the policy server to a client device to obtain information about the client device, and binding the policy server to a second device to obtain information about the second device includes binding the policy server to a server device to obtain information about the server device.

In some embodiments, providing a master policy on the policy server includes providing a master security policy on the policy server.

In some embodiments, binding the policy server to a first device to obtain information about the first device includes obtaining Internet Protocol (IP) address information about the first device.

In some embodiments, binding the policy server to a second device to obtain information about the second device includes obtaining IP address information about the second device.

In some embodiments, the master policy further includes a third component, and the method further includes binding the policy server to a third device to obtain information about the third device, creating a first policy on the policy server using the third component of the master policy and the information about the first and second devices, and sending the third policy to the third device, wherein the first, second, and third devices are peer-to-peer devices.

Figure 3:
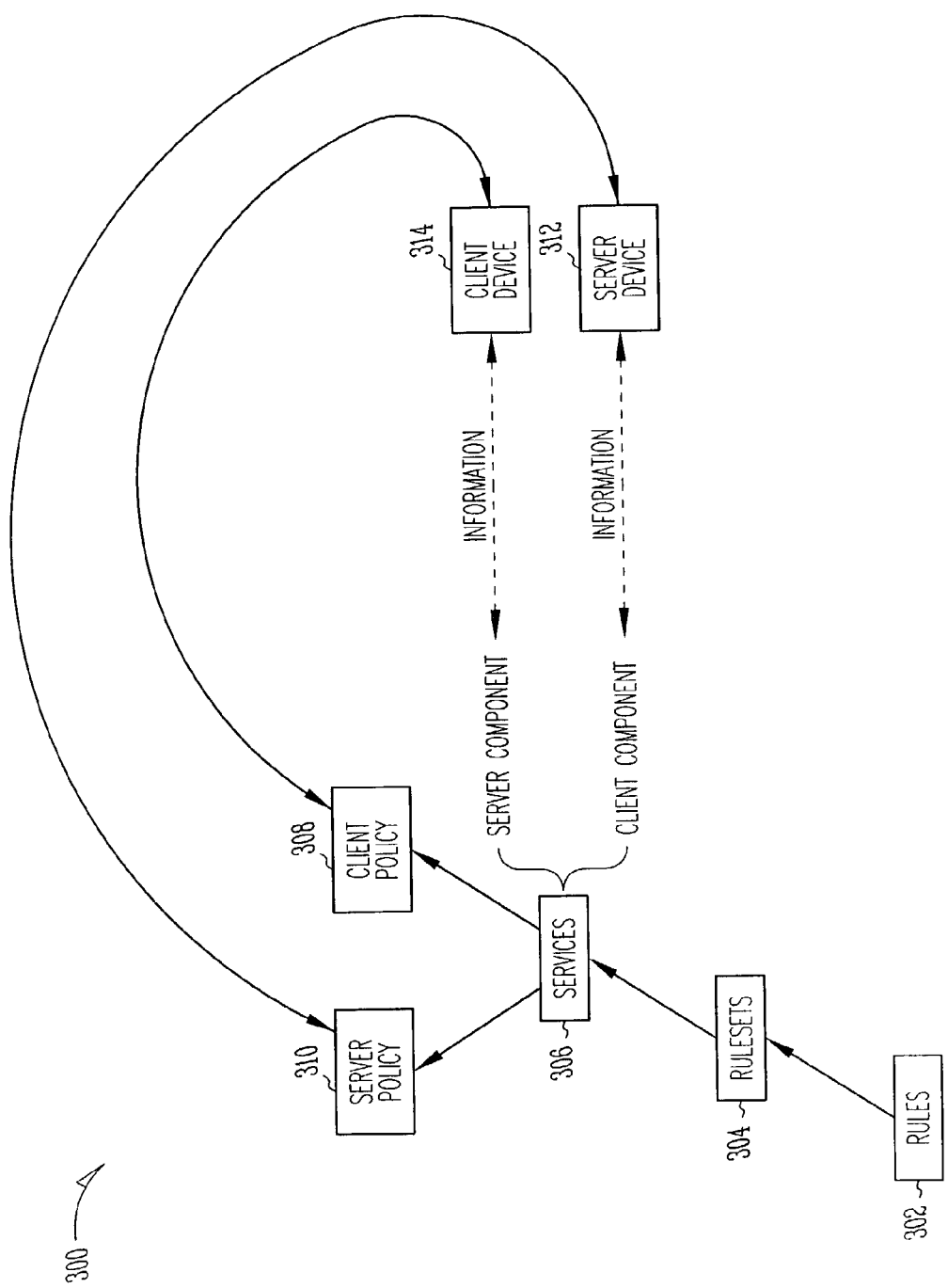
FIG. 3 illustrates a block diagram of an associative policy model, according to one embodiment of the present invention.

FIG. 3 illustrates a block diagram of an associative policy model, according to one embodiment of the present invention In FIG. 3, model 300 includes various components. In one embodiment, rules 302 are included in model 300. Rules 302 include a low-level packet filtering specification that identify various items, such as a port range, a direction, and/or a protocol tuple. In one embodiment, rulesets 304 are included in model 300. A ruleset includes a group of one or more rules (such as rules 302) that represent a networked application (e.g. Domain Name Service, Telnet, etc.). In one embodiment, rulesets 304 includes a ruleset having one or more inbound filtering rules and one or more outbound filtering rules. In one embodiment, services 306 are included in model 300. In one embodiment, a service definition includes one or more rulesets (such as rulesets 304). In the embodiment shown in FIG. 3, the services 306 include service definitions having a client component and a server component. Other embodiments provide other relational components in the service definition. The client component is associated with client device 314 via inclusion of the client component in client policy 308 and associating client device 314 with client policy 308. In one embodiment, the client component contains Internet Protocol (IP) address information about server device 312. The server component is also associated with server device 312 via inclusion in server policy 310, which is associated with server device 312. In one embodiment, the server component contains IP address information about client device 314. In one embodiment, peer to peer services (e.g. NetMeeting) may also be defined. In one embodiment, a service definition defines a relationship between two or more entities (client, server, peer-to-peer, etc.). These entities (devices, users, software packages, etc.) do not need to be specified at the time the service relationship is defined. They may be associated with the service later and the bindings are resolved at that time.

In FIG. 3, a policy (such as client policy 308 or server policy 310) includes one or more services (such as services 306). When an entity or device (such as a laptop) is associated with a policy, the current IP address of the device is processed using the service definition, and the address is incorporated into the policy that contains the associated service (e.g., the other half of the client/server pair, or a peer). For example, if a Telnet service is defined in services 306, it includes a client component and a server component. The client component is included in client policy 308, while the server component is included in server policy 310. In one embodiment, when client device 314 boots up and receives an IP address (e.g., via DHCP), the IP address information of client device 314 is incorporated into the server component of server policy 310 and enforced on server device 312. Likewise, the IP address information of server device 312 is incorporated into the client component of client policy 308 and enforced on client device 314.

In operation, an associative policy system implementing a model such as that shown in FIG. 3 is described as follows. First, rules 302 are written and combined to form a ruleset (to be included in rulesets 304). Rulesets 304 are combined to form a service (to be included in services 306). In one embodiment, a virtual private group (VPG) name is bound to the service. Services 306 are combined to form a policy on a policy server. The IP addresses of client device 314 and server device 312 are determined. In one embodiment, the IP addresses are determined at boot using DHCP. The IP address information is sent to the policy server. In one embodiment, users are associated with server device 312 and client device 314, and both the user and IP address information are sent to the policy server. In one embodiment, the user information is authenticated and/or authorized using a system such as Microsoft Active Directory or Safeword Premier Access (SPA). In this embodiment, the use of such an authentication/authorization system allows the policy assigned to a device to be derived from the authorizations associated with a user.

The policy server next uses the IP address information (and the user information, in one embodiment) to build client policy 308 and server policy 310. Client policy 308 includes the IP address information of server device 312, and server policy 310 includes the IP address information of client device 314. In one embodiment, client policy 308 and server policy 310 include VPG tables for the respective devices. Client policy 308 is sent to client device 314, and server policy 310 is sent to server device 312.

In one embodiment of the invention, a more generalized associative policy system implementing an associative model operates as follows. First, policy specification occurs. This involves specifying the services and the role within the association. These relationships may be client, server, peer-to-peer or single ended. A peer-to-peer entity is a device or system that acts as a peer to another system (vs. a client or a server). It enforces a peer-to-peer service definition that includes the IP addresses VPG binding, or other group identifier of the peers it is authorized to communicate with. A single ended entity is one in which the remote entity is not part of the policy enforcement system. Entities that do not participate in the address resolution process are, in one embodiment, handled under the single ended relationship.

Next, entity binding occurs. This binds an entity to a device. In one embodiment, the entity is bound to a device set. In one embodiment, the entity is further bound to a role (e.g., of a user, etc.). The entity is then bound to a policy that may reside on a policy server.

After entity binding, policy resolution and distribution occur. This phase resolves the policy specification (e.g., binds an IP address to an entity) and converts the human representation of the policy into a machine enforceable policy.

Lastly, policy enforcement occurs. This phase actually implements the policy/rules for the entities in the relationship.

In one embodiment, the processes above are repeated in one or more iterations. For example, if a second client joins the network, the second client's information (e.g., IP address) is added to the server's policy.

In another embodiment of the present invention, a method for managing an associative policy on a policy server is provided. In this embodiment, the method includes providing a policy having a service definition (wherein the service definition has one or more rulesets that each contain one or more placeholders), specifying a role associated with each ruleset, operatively coupling one or more devices to the policy server, and upon such coupling, converting the policy into one or more device policies by inserting device information into the placeholders for each ruleset, and distributing the device policies to the corresponding devices.

In some embodiments, providing a policy having a service definition includes providing a security policy having a service definition. In some embodiments, providing a policy having a service definition includes providing a policy having a service definition, wherein the service definition has one or more rulesets, and wherein each ruleset includes one or more packet filtering rules. In some embodiments, providing a policy having a service definition includes providing a policy having a service definition, wherein the service definition has one or more rulesets that each contain one or more producer or consumer placeholders.

In some embodiments, specifying a role associated with each ruleset includes specifying a role selected from a group consisting of a client role, a server role, a peer-to-peer role, and a single-ended role.

In some embodiments, operatively coupling one or more devices to the policy server includes operatively coupling one or more devices that are members of a VPG or a VPN to the policy server. In some embodiments, operatively coupling one or more devices to the policy server includes operatively coupling first and second devices to the policy server, wherein the first device is a member of a first VPG, and wherein the second device is a member of a second VPG. In some embodiments, operatively coupling one or more devices to the policy server includes operatively coupling one or more devices having Internet Protocol (IP) addresses to the policy server, and wherein the device IP addresses are assigned according to DHCP. In some embodiments, operatively coupling one or more devices to the policy server includes operatively coupling one or more wireless devices to the policy server.

In another embodiment of the present invention, a computer-implemented method on a client is provided. In this embodiment, the method includes obtaining boot information for the client, obtaining role information for a user on the client, sending the boot information and the role information to a policy server, obtaining a client-specific security policy from the policy server, and enforcing the client-specific security policy on the client, wherein the client-specific security policy includes security information about a server that is associated with the client, and wherein the security information is based on boot information and role information for the server.

In some embodiments, obtaining boot information for the client includes obtaining an Internet Protocol (IP) address of the client. In some embodiments, obtaining an IP address of the client includes obtaining an IP address of the client that has been assigned using DHCP.

In some embodiments, the method further comprises authenticating the role information for the user on the client.

Figure 4:
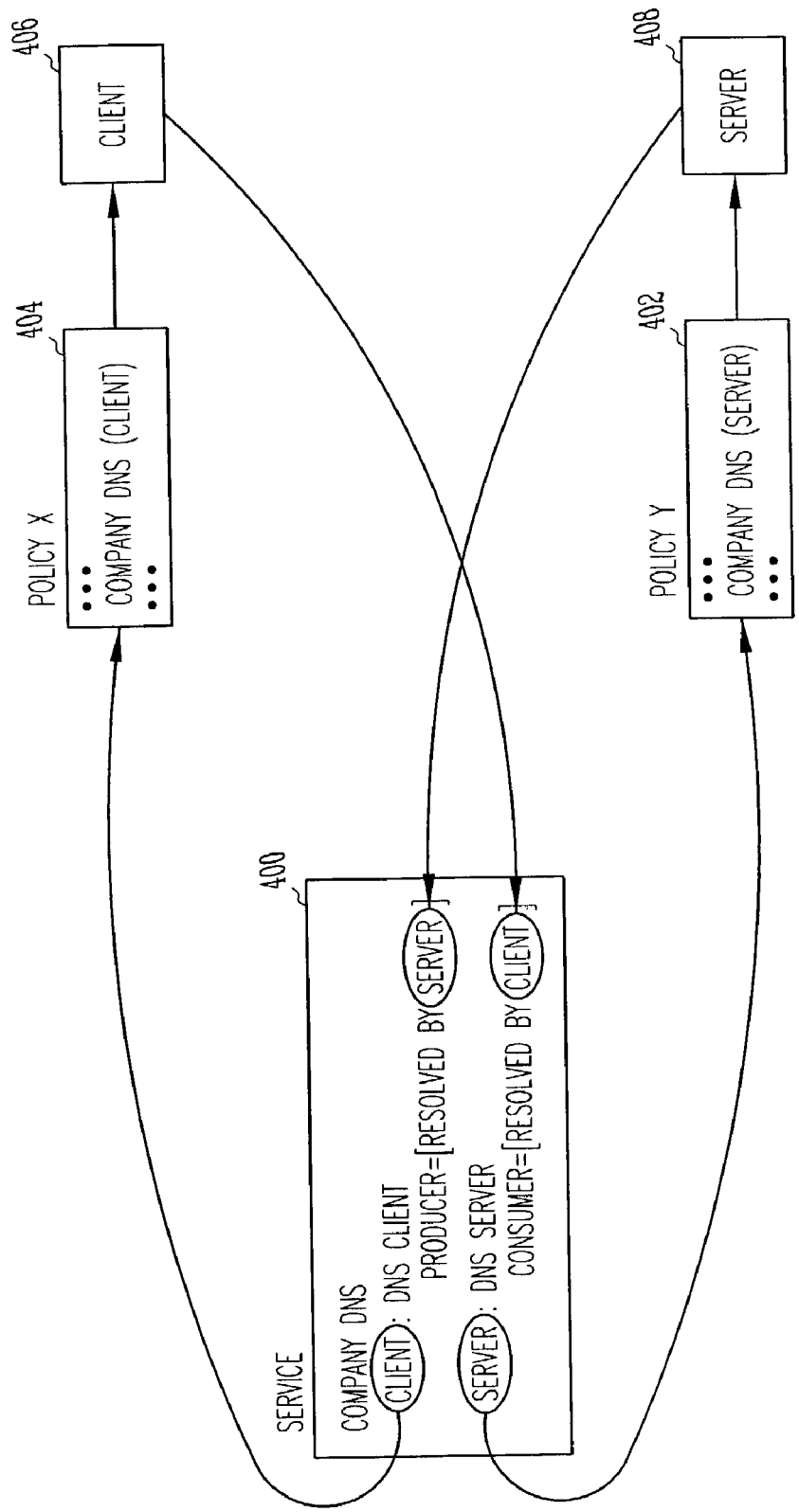
FIG. 4 illustrates a block diagram of a service definition having client and server components, according to one embodiment of the present invention.

FIG. 4 illustrates a block diagram of a service definition having client and server components, according to one embodiment of the present invention. FIG. 4 shows service 400, client policy 404, server policy 402, client 406, and server 408. Service 400 is a company domain name system (DNS) service. It includes a client component and a server component. The client component contains a DNS client ruleset and a DNS server ruleset. The DNS client ruleset includes a producer field (having a producer value placeholder). This field is resolved by server 408. In one embodiment, the IP address of server 408 is inserted as a value into the producer field when server 408 is initialized. The DNS server ruleset includes a consumer field (having a consumer value placeholder). This field is resolved by client 406. In one embodiment, the IP address of client 406 is inserted as a value into the consumer field when client 406 is initialized. The client component of service 400 is used to create client policy 404, which is then bound to client 406. Similarly, the server component of service 400 is used to create server policy 402, which is then bound to server 408.

Figure 5A:
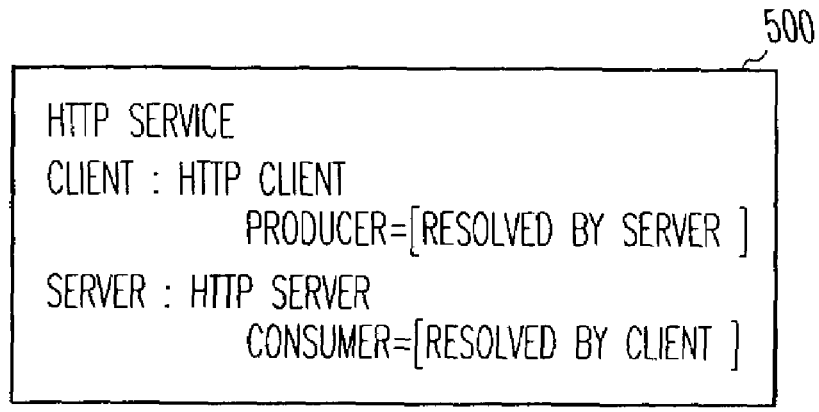
FIG. 5A and FIG. 5B illustrate block diagrams of various service definitions having client and server components, according to certain embodiments of the present invention.
Figure 5B:
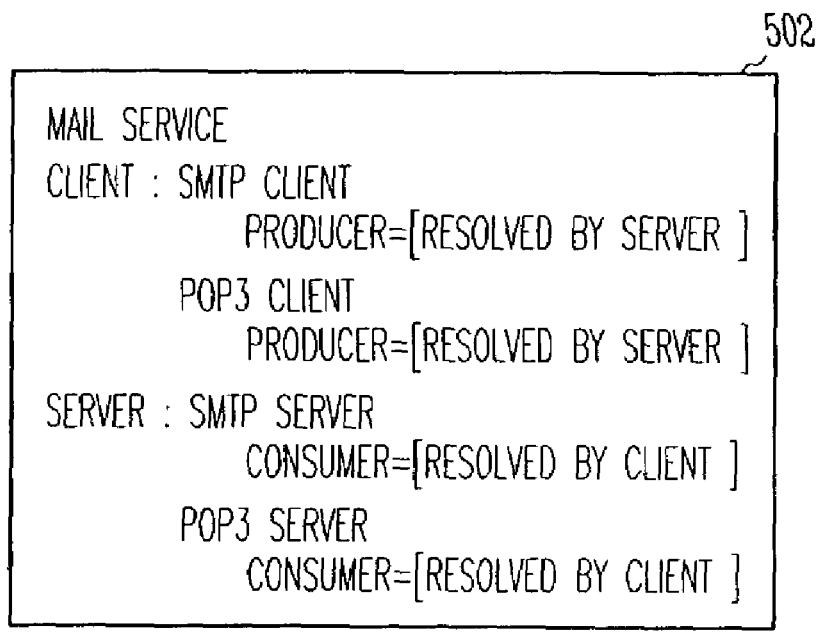

FIG. 5A and FIG. 5B illustrate block diagrams of various service definitions having client and server components, according to certain embodiments of the present invention. FIG. 5A shows a Hypertext Transfer Protocol (HTTP) service definition 500. HTTP service definition 500 serves as one example of a service that may be defined on a policy server in one embodiment of the present invention. HTTP service definition 500 includes a client component (HTTP client) and a server component (HTTP server). The client component includes a placeholder for a producer field that is to be resolved by a server, and the server component includes a placeholder for a consumer field that is to be resolved by a client. The client component can then be used by the policy server, in one embodiment, to create a client-specific policy that is bound to the client, and the server component can be used to create a server-specific policy that is bound to the server. HTTP service definition 500 hides the details of the producer and consumer information that is later resolved by the server and client, respectively, when creating the individual policies. This allows for more generic and topology independent service definitions.

FIG. 5B shows a mail service definition 502. Mail service definition 502 serves as another example of a service that may be defined on a policy server in one embodiment of the present invention. Mail service definition 502 includes a client component and a server component. The client component includes a Simple Mail Transfer Protocol (SMTP) client component and a Post Office Protocol 3 (POP3) client component. The SMTP and POP3 client components each include a placeholder for a producer field that is to be resolved by a server. The server component includes a SMTP server component and a POP3 server component. The SMTP and POP3 server components each include a placeholder for a consumer field that is to be resolved by a client. In one embodiment, a SMTP client (bound to the SMTP client component in mail service definition 502) and a POP3 client (bound to the POP3 client component) are members of a VPG. In this embodiment, the policy server would send encryption keys for the VPG to the SMTP client and POP3 client for added security in communication.

The following table shows an example of an HTTP client ruleset having a client HTTP transmit (Tx) rule and client HTTP receive (Rx) rule.

TABLE 1

HTTP Client Ruleset

```
<ruleset name = "HTTP client">
<rule
    name = "Client HTTP Tx"
    sourceHostID = "EFW Device IP"
    sourceMask = "255.255.255.255"
    sourcePortRange = "1024-65535"
    destinationHostID = "PRODUCER"
    destinationMask = "Not Applicable"
    destinationPortRange = "80"
    direction = "out"
    action = "allow"
    ipProtocol = "tcp (6)"
    enabled = "true"
    audit = "false"
    testMode = "false"
    ruleNegated = "false"
    allowTCPConnectInit = "false"
>
</rule>
<rule
    name = "Client HTTP Rx"
    sourceHostID = "PRODUCER"
    sourceMask = "Not Applicable"
    sourcePortRange = "80"
    destinationHostID = "EFW Device IP"
    destinationMask = "255.255.255.255"
    destinationPortRange = "1024-65535"
    direction = "in"
    action = "allow"
    ipProtocol = "tcp (6)"
. . .
```

As can be seen in Table 1, the client HTTP transmit rule contains a variable named "destinationHostID," and the client HTTP receive rule contains a variable named "sourceHostID." Each of these variables has a placeholder value of "PRODUCER." This placeholder name is specified at the time of policy construction. In one embodiment, a policy server will be coupled with a client and server entity. Upon coupling, the server entity will send the policy server its IP address information (in one embodiment), and the policy server will dynamically create a client-specific policy, and insert the server's IP address information into the "PRODUCER" placeholder of this policy. Then, the policy server will send the client entity a copy of the client-specific policy, which contains the specific IP address information of the server.

In various embodiments of the invention, various different rulesets (or service components) may be defined for the service definitions in policies managed by a policy server. Table 1 shows an example of an HTTP client ruleset. Table 2 below shows examples of this and many other rulesets that may be defined in a service. Table 2 is used for exemplary purposes only, and includes a non-exclusive list of rulesets (or components) that can be used. Some of the rulesets listed may require extra placeholders beyond "PRODUCER" and "CONSUMER."

TABLE 2

Example Rulesets

| | |
|---|---|
| HTTP client | Telnet client |
| HTTP server | Telnet server |
| HTTPS client | MSDS client |
| HTTPS server | MSDS server |
| Web proxy client | MSRPC client |
| Web proxy server | MSRPC server |

TABLE 2-continued

Example Rulesets

| | |
|---|---|
| IMAP client | DNS client |
| IMAP server | DNS server |
| Kerberos client | DHCP client |
| Kerberos server | DHCP server |
| NTP client | FTP client |
| NTP server | FTP server |
| POP3 client | NetBIOS client |
| POP3 server | NetBIOS server |
| SMTP client | X client |
| SMTP server | X server |

In other embodiments, other rulesets (beyond those of client and server) are included in the service definitions.

Figure 6:
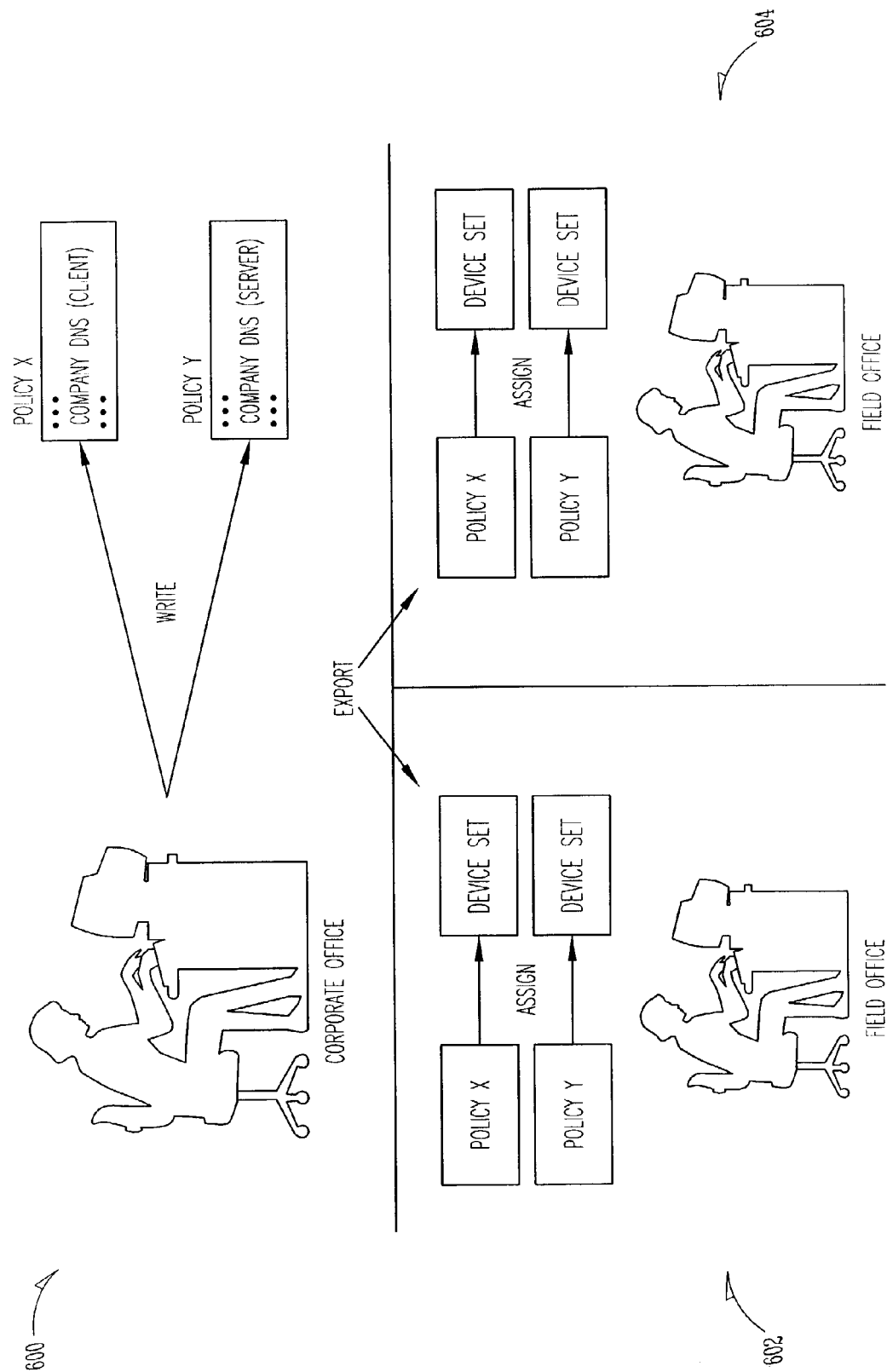
FIG. 6 illustrates a block diagram of policy specification distribution from a corporate office to field offices, according to one embodiment of the present invention.

FIG. 6 illustrates a block diagram of policy specification distribution from a corporate office to field offices, according to one embodiment of the present invention. FIG. 6 shows corporate office 600 and field offices 602 and 604. In the policy specification distribution process, various policies are written at the corporate office 600. In the example shown in FIG. 6, a "Policy X" and a "Policy Y" have been written. "Policy X" includes a service having a DNS client component (or ruleset, in one embodiment), and "Policy Y" includes a service having a DNS server component (or ruleset, in one embodiment). "Policy X" and "Policy Y" are generic policy specifications, and do not contain any client or server-specific details that are network, or topology, dependent (such as IP addresses, etc.). These generic policies are then exported to field offices 602 and 604. In these field offices, the policies are assigned to various device sets. Upon assignment, the DNS client and server components are resolved by, and bound to, the devices in the various device sets. It is only then when network-dependent information, such as IP addresses of the devices, are included in the specific policies used by the devices. The distribution system shown in FIG. 6 allows generic policies to be authored at a corporate office 600 and exported to field offices 602 and 604. In this fashion, a consistent security policy can be consistently enforced throughout the field offices.

Certain embodiments of the present invention are linked to virtual private groups (VPG's). This creates cryptographically protected tunnels between devices based upon the associations defined by an administrator.

In various embodiments, a system implementing an associative policy model reduces errors and labor by allowing the administrator to identify services (e.g. FTP) and then build policies as collections of services. When these services are then associated with devices, the policy server resolves IP addresses automatically and provides an updated policy to the managed devices. There are many benefits and advantages to such an approach when compared to other traditional approaches. Some of these benefits and advantages are discussed below.

Additional Server(s) Added

Traditional singled ended policy models typically require the administrators to explicitly specify the DNS name or IP address of servers so that filtering rules can be instantiated at the client firewall or within intermediate devices (such as routers). In such traditional models, if an organization adds an additional server (for load sharing, fault tolerance, etc.), the administrator must update the existing policies to add the IP address or DNS name of the server into all of the applicable client/router policies. In some embodiments of the present invention utilizing an associative policy, however, the administrator simply associates the new server with the existing server device set and all of the client policies are automatically updated without modifying a single policy.

Existing Server(s) Relocated

Generally, servers are stationary, stable hosts. However, occasionally a server needs to be relocated because of a network change (e.g. adding a router) or because an of an organizational change. Typically, when this occurs, the security policies must be updated (in a traditional system) to allow all of the clients to access the new IP address. However, in certain embodiments of the present invention, the associative policy mechanisms learn the IP address of a server each time it boots up, and the address is written into the policies of the clients authorized to access the server.

Another consideration is the use of DHCP. DHCP is used to assign IP addresses to workstations. This can simplify IP address administration for network administrators, but it also creates issues for security policies based upon IP addresses. For example, assume one user/workstation is authorized access a database server while a second user/workstation is not. The database server security policy could include the IP address of the authorized user workstation. However, if the user/workstation IP address changes due to the use of DHCP, the database policy is no longer valid. Due to the difficulty of managing IP address based policies in this dynamic environment, many security administrators in the past have given up and do not attempt to enforce IP address limits. Certain embodiments of the present invention, however, utilize an associative policy model and supporting mechanisms to address this issue by learning the IP address of the user/workstation each time it boots up. This address is then loaded into the policy of the database. This provides maximum security without the cost of manually maintaining addresses.

Network in Dependent Policy Specification

Frequently, an organization has firewall and policy specification experts at a central office while many of the administrators at smaller sites have less training and experience. There is a need for a mechanism which allows the highly skilled central administrators to write portable policies that can be imported and used by less skilled administrators. The associative policy specification scheme of various embodiments of the present invention allow a policy to be written independent of the machine names, IP addresses or remote network topology. The administrator importing an associative policy constructed offsite only needs to associate machines with their roles/device sets (in one embodiment). The importing administrator does not need to specify protocols, port numbers, IP addresses or the information on intermediate devices such as routers.

Dynamic Membership for Peer-to-Peer Services

An administrator may need to define a peer-to-peer network service (e.g., Microsoft NetMeeting) whose members change frequently. The traditional approach of constructing a policy explicitly identifies, for the purposes of specifying allowed communication, current members by their IP addresses. Resulting policies are error-prone and expensive to maintain, because the IP addresses are changing constantly. The associative policy specification scheme of various embodiments of the present invention, however, allows the administrator to add and drop members merely by adding or removing the service to or from the members' policies. The policies do not require explicit IP addresses (at the management interface) to identify current clients of the service. So the policy itself does not change as membership changes.

Ephemeral Ports

Many applications (e.g., Microsoft NetMeeting) do not use a single well known port. Instead, they randomly pick ports. This makes it extremely difficult to write effective packet filters. One traditional approach to this issue has been to use stateful packet inspection. However, this only ensures that a session properly follows the protocol state machine. It does not determine if the communication with the remote address is actually authorized. The associative policy approach of certain embodiments of the present invention allows the policy enforcement device to actually determine if communications with the remote entity on the range of ports is authorized. When associative policy is combined with VPG or VPN technology (in some embodiments), it also thwarts spoofing of the remote address.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the described embodiments of the present invention.

What is claimed is:

1. A method for implementing an associative policy, the method comprising:
   providing a policy on a policy server, the policy having a plurality of service definitions, wherein each service definition contains first and second relational components;
   providing first and second network entities;
   operatively coupling the first and second network entities to the policy server;
   dynamically associating the first network entity with the second network entity from within the policy server, wherein associating includes:
      selecting a service definition from the plurality of service definitions to apply to the first and second network entities;
      sending a message from the policy server to the first network entity binding the first relational component of the selected service definition in the policy to the first network entity, and
      sending a message from the policy server to the second network entity binding the second relational component of the selected service definition in the policy to the second network entity; and
   enforcing the policy on the first and second network entities.

2. The method of claim 1, wherein providing a policy on a policy server includes providing a security policy on a policy server.

3. The method of claim 1, wherein the service definition corresponds to a service.

4. The method of claim 1, wherein each of the first and second relational components includes one or more packet filtering rulesets.

5. The method of claim 1, wherein the first relational component is a client relational component and the second relational component is a server relational component, and wherein the first and second network entities are a server device and a client device, respectively.

6. The method of claim 1, wherein the first and second network entities are selected from a group consisting of devices, users, and software packages.

7. The method of claim 1, wherein the first and second network entities are first and second members of a virtual private group (VPG), respectively.

8. The method of claim 1, wherein the first and second network entities are a member of a first VPG and a member of a second VPG, respectively.

9. The method of claim 1, wherein the first and second network entities are associated with one or more device sets.

10. The method of claim 1, wherein providing first and second network entities includes assigning Internet Protocol (IP) addresses to those entities dynamically.

11. The method of claim 1, wherein each of the first and second network entities include a network interface device for managing an embedded firewall, wherein the embedded firewall is embedded in a network interface device.

12. The method of claim 1, wherein operatively coupling the first and second network entities to the policy server includes sending the Internet Protocol (IP) addresses of the first and second network entities to the policy server.

13. The method of claim 1, wherein operatively coupling the first and second network entities to the policy server includes:
   binding a first user to the first network entity, the first user being associated with a first role;
   binding a second user to the second network entity, the second user being associated with a second role;
   identifying a first Internet Protocol (IP) address of the first network entity;
   identifying a second IP address of the second network entity;
   sending the first role and first IP address information to the policy server; and
   sending the second role and second IP address information to the policy server.

14. A method for managing an associative policy on a policy server, the method comprising:
   providing a policy having a service definition, wherein the service definition has one or more rulesets that each contain one or more placeholders;
   specifying a role associated with each ruleset;
   operatively coupling one or more devices to the policy server; and
   upon such coupling,
      receiving boot and role information from the coupled devices;
      converting the policy into one or more device policies by inserting device information into the placeholders for rulesets corresponding to each of the coupled devices, and
      distributing the device policies to the corresponding devices.

15. The method of claim 14, wherein providing a policy having a service definition includes providing a security policy having a service definition.

16. The method of claim 14, wherein the service definition has one or more rulesets, and wherein each ruleset includes one or more packet filtering rules.

17. The method of claim 14, wherein specifying a role associated with each ruleset includes specifying a role selected from a group including one or more of a client role, a server role, a peer-to-peer role, and a single-ended role.

18. The method of claim 14, wherein the one or more devices are members of a virtual private group (VPG).

19. The method of claim 14, wherein operatively coupling one or more devices to the policy server includes operatively coupling first and second devices to the policy server, wherein the first device is a member of a first VPG, and wherein the second device is a member of a second VPG.

20. The method of claim 14, wherein the one or more coupled devices have dynamically assigned IP addresses.

21. The method of claim 14, wherein operatively coupling one or more devices to the policy server includes operatively coupling one or more wireless devices to the policy server.

22. A computer-implemented method on a policy server, the method comprising:
prov016ing a master policy on the policy server, the master policy having a first component and a second component;
binding the policy server to a first device to obtain information about the first device;
binding the policy server to a second device to obtain information about the second device;
creating a first policy on the policy server using the first component of the master policy and the information about the second device;
creating a second policy on the policy server using the second component of the master policy and the information about the first device;
sending the first policy to the first device; and
sending the second policy to the second device.

23. The computer-implemented method of claim 22, wherein:
binding the policy server to a first device to obtain information about the first device includes binding the policy server to a client device to obtain information about the client device; and
binding the policy server to a second device to obtain information about the second device includes binding the policy server to a server device to obtain information about the server device.

24. The computer-implemented method of claim 22, wherein providing a master policy on the policy server includes providing a master security policy on the policy server.

25. The computer-implemented method of claim 22, wherein binding the policy server to a first device to obtain information about the first device includes obtaining Internet Protocol (IP) address information about the first device.

26. The computer-implemented method of claim 22, wherein binding the policy server to a second device to obtain information about the second device includes obtaining IP address information about the second device.

27. The computer-implemented method of claim 22, wherein the master policy further includes a third component, and wherein the method further comprises:
binding the policy server to a third device to obtain information about the third device;
creating a third policy on the policy server using the third component of the master policy and the information about the first and second devices; and
sending the third policy to the third device,
wherein the first, second, and third devices are peer-to-peer devices.

28. A computer-implemented method on a client, the method comprising:
obtaining boot information for the client;
obtaining role information for a user on the client;
sending the boot information and the role information to a policy server;
obtaining a client-specific security policy from the policy server; and
enforcing the client-specific security policy on the client, wherein the client-specific security policy includes security information about a server that is associated with the client, and
wherein the security information is based on boot information and role information for the server.

29. The computer-implemented method of claim 28, wherein obtaining boot information for the client includes obtaining an Internet Protocol (IP) address of the client.

30. The computer-implemented method of claim 29, wherein the IP address of the client is dynamically assigned.

31. The computer-implemented method of claim 28, wherein the method further comprises authenticating the role information for the user on the client.

32. A policy server, comprising:
a master security policy having a client component and a server component;
an interface to couple the policy server with a server device and a client device; and
wherein the policy server is operable to:
obtain server information about the server device;
obtain client information about the client device;
create a client policy using the client component of the master security policy and the server information;
create a server policy using the server component of the master security policy and the client information;
send the client policy to the client device; and
send the server policy to the server device.

33. A computer-implemented method on a server, the method comprising:
obtaining boot information for the server;
obtaining role information for the services provided by the server;
sending the boot information and the role information to a policy server;
obtaining a server-specific security policy from the policy server; and
enforcing the server-specific security policy on the server, wherein the server-specific security policy includes security information about one or more clients that are associated with the server, and
wherein the security information is based on boot information and role information for the one or more clients.

34. The computer-implemented method of claim 33, wherein obtaining boot information for the server includes obtaining an Internet Protocol (IP) address of the server.

35. The computer-implemented method of claim 34, wherein obtaining an IP address of the server includes assigning the IP address dynamically.

36. The computer-implemented method of claim 33, wherein obtaining role information for the services includes authenticating the role information for the services on the server.

37. The computer-implemented method of claim 33, wherein the services provided by the server include one or more services selected from a group of services including one or more of a email service, a sales database service, a network basic input/output system (NetBIOS) service, or a web service.

38. A computer-implemented method on a policy server, the method comprising:
receiving boot information for a server;
receiving role information for the services provided by the server;
receiving boot information for one or more clients associated with the server;
receiving role information for a user on one or more of the clients;
creating a server-specific security policy from a master security policy wherein the server-specific security policy includes security information about one or more of the clients that are associated with the server, and wherein the security information is based on boot information and role information for each client;

creating a client-specific security policy form a master security policy wherein the client-specific security policy includes security information about the server, and wherein the security information is based on boot information and role information for the server;

sending the server-specific security policy to the server; and sending the client-specific security policy to each client.

39. The computer-implemented method of claim 38, wherein receiving boot information for the server includes receiving an Internet Protocol (IP) address of the server.

40. The computer-implemented method of claim 38, wherein receiving boot information for the client includes receiving an Internet Protocol (IP) address of the client.

41. A system, comprising:
a network;
a first network entity coupled to the network;
a second network entity coupled to the network; and
a policy server coupled to the network, the policy server having a associative policy;
wherein the policy server is operable to:
receive boot and role information from the first network entity;
receive boot and role information from the second network entity;
create a first network entity specific policy utilizing the received boot and role information from the first and second network entities;
create a second network entity specific policy utilizing the received boot and role information from the first and second network entities;
send the first entity policy to the first network entity; and
send the second entity policy to the second network entity.

42. The system of claim 41, wherein the associative policy is a security policy that includes a first set of rules and a second set of rules, and each of the set of rules having one or more placeholders.

43. The system of claim 42, wherein the creation of network entity specific policies includes inserting entity information received from the first and second network entities into the placeholders of the first and second set of rules.

44. The system of claim 41, wherein the associative policy contains one or more service definitions.

45. The system of claim 41, wherein the first network entity includes a first computer and a first network interface device, and wherein the second network entity includes a second computer and a second network interface device.

46. The system of claim 45, wherein the first and second network interface devices each include an embedded firewall for authorizing data packets.

47. The system of claim 41, wherein the first network entity includes a first computer having a first software component, and wherein the second network entity includes a second computer having a second software component.

* * * * *

UNITED STATES PATENT AND TRADEMARK OFFICE
CERTIFICATE OF CORRECTION

PATENT NO. : 7,308,706 B2
APPLICATION NO. : 10/281843
DATED : December 11, 2007
INVENTOR(S) : Markham et al.

It is certified that error appears in the above-identified patent and that said Letters Patent is hereby corrected as shown below:

On page 2, item (56), under "Other Publications", in column 1, line 2, delete "hamey" and insert -- Harney --, therefor.

On page 2, item (56), under "Other Publications", in column 1, line 9, delete "Antigen" and insert -- Antigone --, therefor.

On page 2, item (56), under "Other Publications", in column 2, lines 19-20, delete "NO 10,234,224," and insert -- No 10/234,224, --, therefor.

On page 2, item (56), under "Other Publications", in column 2, line 29, delete "10-234,224," and insert -- 10/234,224, --, therefor.

On page 2, item (56), under "Other Publications", in column 2, line 37, delete "retrieved" and insert -- Retrieved --, therefor.

In column 3, line 17, delete "embodiments," and insert -- embodiment, --, therefor.

In column 6, line 31, before "In FIG. 3," insert -- . --.

In column 11, line 28, delete "client" and insert -- client- --, therefor.

In column 12, line 7, after "because" delete "an".

In column 12, line 35, delete "in Dependent" and insert -- Independent --, therefor.

Signed and Sealed this

First Day of July, 2008

JON W. DUDAS
*Director of the United States Patent and Trademark Office*